(12) United States Patent
Hsu et al.

(10) Patent No.: US 10,415,743 B2
(45) Date of Patent: Sep. 17, 2019

(54) ELEVATION-ADJUSTABLE DISPLAY SCREEN SUPPORT ARM

(71) Applicant: CHEN-SOURCE INC., Taoyuan (TW)

(72) Inventors: Chung-Jong Hsu, Taoyuan (TW); Te-Jung Yuan, Taoyuan (TW)

(73) Assignee: CHEN-SOURCE INC., Taoyuan (TW)

( * ) Notice: Subject to any disclaimer, the term of this patent is extended or adjusted under 35 U.S.C. 154(b) by 0 days.

(21) Appl. No.: 15/720,415

(22) Filed: Sep. 29, 2017

(65) Prior Publication Data

US 2019/0101240 A1    Apr. 4, 2019

(51) Int. Cl.
| | | |
|---|---|---|
| F16M 11/42 | (2006.01) | |
| E05B 73/00 | (2006.01) | |
| F16M 11/06 | (2006.01) | |
| F16M 13/02 | (2006.01) | |
| F16M 11/14 | (2006.01) | |

(52) U.S. Cl.
CPC ......... *F16M 11/42* (2013.01); *E05B 73/0082* (2013.01); *F16M 11/06* (2013.01); *F16M 13/02* (2013.01); *F16M 11/14* (2013.01); *F16M 2200/041* (2013.01); *F16M 2200/063* (2013.01); *F16M 2200/08* (2013.01)

(58) Field of Classification Search
CPC ........ F16M 11/42; F16M 11/06; F16M 13/02; F16M 11/14; F16M 2200/041; F16M 2200/063; F16M 2200/08; F16M 13/022; E05B 73/0082; F16B 7/10; B60N 2/165
USPC ...... 248/122.1, 125.1, 125.2, 161, 422, 584, 248/421, 423
See application file for complete search history.

(56) References Cited

U.S. PATENT DOCUMENTS

| | | | | |
|---|---|---|---|---|
| 7,410,143 B2* | 8/2008 | Chen | .................... | F16M 11/046 |
| | | | | 248/176.3 |
| 7,854,417 B2* | 12/2010 | Gan | ...................... | F16M 11/24 |
| | | | | 248/122.1 |
| 8,272,617 B2* | 9/2012 | Huang | ................... | F16M 11/18 |
| | | | | 248/422 |
| 8,276,869 B2* | 10/2012 | Huang | ................... | F16M 11/18 |
| | | | | 248/422 |
| 9,046,213 B2* | 6/2015 | Huang | ................. | F16M 11/046 |
| 9,976,699 B2* | 5/2018 | Hung | ..................... | F16M 13/02 |
| 2005/0205725 A1* | 9/2005 | Yokouchi | ............... | F16M 11/10 |
| | | | | 248/125.1 |

(Continued)

*Primary Examiner* — Christopher Garft
(74) *Attorney, Agent, or Firm* — Muncy, Geissler, Olds & Lowe, P.C.

(57) ABSTRACT

An elevation-adjustable display screen support arm includes arm shaft with box-like shaft body, balance adjustment mechanism accommodated in box-like shaft body and including gear train, first sliding tooth rack, second sliding tooth rack and tension spring, and display screen mounting head including body block, first guideway, second guideway and connection panel. When adjusting the elevation of the supported display screen, body block is driven to move first sliding tooth rack in rotating gear train, causing gear train to move second sliding tooth rack in driving actuating plate to stretch or compress tension spring, and thus, rotation of gear train causes tension spring to provide a corresponding torque that is acted upon first sliding tooth rack to control upward or downward movement of display screen mounting head and supported display screen in stepless manner.

12 Claims, 10 Drawing Sheets

(56) References Cited

U.S. PATENT DOCUMENTS

| | | | |
|---|---|---|---|
| 2007/0064379 A1* | 3/2007 | Shin | F16M 11/105 361/679.06 |
| 2007/0064380 A1* | 3/2007 | Shin | F16M 11/105 361/679.07 |
| 2007/0102596 A1* | 5/2007 | Sung | F16M 11/105 248/122.1 |
| 2007/0278364 A1* | 12/2007 | Jang | F16M 11/105 248/161 |
| 2008/0099637 A1* | 5/2008 | Pai | F16M 11/30 248/157 |
| 2008/0264885 A1* | 10/2008 | Bi | F16M 11/10 211/208 |
| 2009/0166482 A1* | 7/2009 | Gan | F16M 11/14 248/122.1 |
| 2009/0179133 A1* | 7/2009 | Gan | F16M 11/105 248/422 |
| 2009/0189048 A1* | 7/2009 | Gan | F16M 11/24 248/422 |
| 2010/0006716 A1* | 1/2010 | Yen | F16M 11/10 248/125.1 |
| 2010/0032532 A1* | 2/2010 | Jang | F16M 11/046 248/122.1 |
| 2011/0089304 A1* | 4/2011 | Fenelon | A47B 9/04 248/404 |
| 2012/0019990 A1* | 1/2012 | Segar | F16M 11/08 361/679.01 |
| 2012/0025055 A1* | 2/2012 | Huang | F16M 11/18 248/422 |
| 2013/0256489 A1* | 10/2013 | Ergun | F16M 11/10 248/297.11 |
| 2014/0034799 A1* | 2/2014 | Fallows | F16M 11/046 248/297.21 |
| 2014/0265193 A1* | 9/2014 | Stark | B62B 3/10 280/47.34 |
| 2015/0001355 A1* | 1/2015 | Huang | F16M 11/046 248/123.11 |
| 2015/0345543 A1* | 12/2015 | Schlack | F16C 11/04 403/54 |
| 2017/0159879 A1* | 6/2017 | Hung | F16M 13/02 |

* cited by examiner

ELEVATION-ADJUSTABLE DISPLAY SCREEN SUPPORT ARM

BACKGROUND OF THE INVENTION

1. Field of the Invention

The present invention relates to display screen support technology and more particularly, to an elevation-adjustable display screen support arm, which comprises an arm shaft with a box-like shaft body, a balance adjustment mechanism accommodated in the box-like shaft body and comprising a gear train, a first sliding tooth rack and a second sliding tooth rack meshed with the gear train at two opposite sides and a tension spring connected to the second sliding tooth rack, and a display screen mounting head comprising a body block, a first guideway and a second guideway respectively mounted on two side panels of the box-like shaft body and a connection panel mounted at a back side of the body block and fixedly connected to the first sliding tooth rack, the first guideway and the second guideway. When adjusting the elevation of the supported display screen, the body block is driven to move the first sliding tooth rack in rotating the gear train, causing the gear train to move the second sliding tooth rack in driving the actuating plate to stretch or compress the tension spring, and thus, rotation of the gear train causes the tension spring to provide a corresponding torque that is acted upon the first sliding tooth rack to control upward or downward movement of the display screen mounting head and the supported display screen in a stepless manner.

2. Description of the Related Art

Monitors and TV display screens are popularly used in today's home life, offices, schools and workstations. Due to the drawbacks of being bulky with poor quality and capable of receiving analog signal only, the early cathode ray tube type display screens have been eliminated by the market. Nowadays, LCD or plasma-type display screens have been widely used to replace conventional cathode ray tube type designs for the advantages of having light, thin, clear picture characteristics and being capable of receiving analog and digital signals. However, commercial display screens stands simply allow view angle adjustment within a small range. During display screen view angle adjustment, the user must pay attention to the location of the center of gravity of the display screen to avoid dumping. A display screen can be mounted in a wall or at a high place. However, commercial wall mount type display screen support designs do not allow easy adjustment of the installation position and view angle of the supported display screen, limiting the application.

In order to meet the user's need to adjust display screen angular position and to minimize desktop or workstation installation space, angle-adjustable display screen support devices are created. These commercial angle-adjustable display screen support devices can be installed on a desktop, pylons or wall with a hanger bracket or wall bracket. Through swivel arms or lifting torque arms of angle-adjustable display screen support devices, the user can adjust the view angle and position of the supported display screen conveniently. In actual application, a user will often need to operate a keyboard and a mouse. A display screen can be mounted with a keyboard and mouse on aswivel arm or lifting torque arm of an angle-adjustable display screen support device so that the user can watch the display screen and operate the keyboard and the mouse in a standing or sitting position. However, conventional angle-adjustable display screen support devices do not allow adjustment of the elevation of the supported display screen, keyboard and mouse according to the user's body height. Thus, the user may feel uncomfortable when watching the supported display screen or operating the keyboard and the mouse. There is a commercial angle-adjustable display screen support device that allows adjustment of the lifting column between the supported display screen and the keyboard and mouse tray. However, the adjustment of the lifting column requires a special hand tool or needs to fasten a lock screw. This display screen elevational adjustment procedure is complicated. This design still cannot fit all different users having different body heights, resulting improper operating posture of the user. Thus, this design is less ergonomic. When the display screen is mounted on the lifting column of the angle-adjustable display screen support device, if the support force of the lifting column is not properly adjusted and positively locked, the support device will be unable to move or be sagged by gravity, causing structural damage of the support device. In actual application, conventional display screen support designs still have drawbacks that must be improved.

SUMMARY OF THE INVENTION

The present invention has been accomplished under the circumstances in view. It is the main object of the present invention to provide an elevation-adjustable display screen support arm, which comprises an arm shaft, a balance adjustment mechanism, and a display screen mounting head. The arm shaft comprises a box-like shaft body defining therein an accommodation chamber and a front opening in communication with the accommodation chamber, and an outer cover fastened to the box-like shaft body and covered over the front opening. The outer cover defines therein an upper opening in communication with the front opening and the accommodation chamber. The balance adjustment mechanism is mounted in the accommodation chamber of the box-like shaft body, comprising a first sliding tooth rack, a second sliding tooth rack, a gear train meshed between the first sliding tooth rack and the second sliding tooth rack, a tension spring connected between the box-like shaft body and the second sliding tooth rack, and an actuating plate mounted at the second sliding tooth rack and connected to a bottom end of the tension spring. The display screen mounting head comprises a body block for supporting a display screen at a front side thereof, a first guideway and a second guideway respectively mounted on the two side panels of the box-like shaft body, and a connection panel mounted at an opposing back side of the body block and inserted through the upper opening of the outer cover into the inside of the box-like shaft body and fixedly connected to the first sliding tooth rack, the first guideway and the second guideway. When the user adjusts the elevation of the supported display screen, the body block of the display screen mounting head is driven to move the first sliding tooth rack in rotating the gear train, causing the gear train to move the second sliding tooth rack in driving the actuating plate to stretch or compress the tension spring, and thus, rotation of the gear train causes the tension spring to provide a corresponding torque that is acted upon the first sliding tooth rack to control upward or downward movement of the display screen mounting head and the supported display screen in a stepless manner. Thus, the user can adjust the elevation of the display screen easily with less effort.

Further, when the user moves the display screen upward or downward to adjust its elevation, the body block of the display screen mounting head drives the first sliding tooth rack of the balance adjustment mechanism and a slide of the first guideway to move upward or downward along a track. At this time, a slide of the second guideway is forced to move downward or upward along the track, the first sliding tooth rack drives drive gear and driven gear of the gear train to rotate, causing the driven gear to move the second sliding tooth rack, and therefore the actuating plate is forced to move in the same direction of the first sliding tooth rack. At the same time, the tension spring is forced by the actuating plate to stretch or compress. Thus, rotation of the gear train causes the tension spring to provide a corresponding torque that is acted upon the first sliding tooth rack to control upward or downward movement of the display screen mounting head and the display screen. The first guideway and the second guideway assist the body block to reciprocate stably and smoothly in the longitudinal direction, allowing adjustment of the elevation of the display screen in a stepless manner without the use of any tool or fixation screws and keeping the display screen for automatic positioning. Further, by means of stopping a stop block of the second sliding tooth rack at the top or bottom end of a position-limiting slot of the box-like shaft body, the elevation adjustment of the display screen is limited to a predetermined range, avoiding overstretch of the tension spring and automatic positioning failure of the display screen. Thus, the user can adjust the elevation of the display screen easily with less effort.

Preferably, the balance adjustment mechanism further comprises a torque adjustment unit. The torque adjustment unit comprises a stop member set between the box-like shaft body and the tension spring, and an adjustment screw mounted in the stop member. The tension spring has the opposing top and bottom ends thereof respectively connected to the stop member and the actuating plate of the second sliding tooth rack so that rotating the adjustment screw drives the stop member to adjust the tension of the tension spring. When the user wishes to adjust the load, use a tool to rotate the adjustment screw clockwise or counterclockwise, causing the stop member to stretch or compress the tension spring. Thus, the user can fasten tight or loosen the adjustment screw of the torque adjustment unit according to the weight of the display screen to be supported, controlling lifting smoothness of the display screen.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
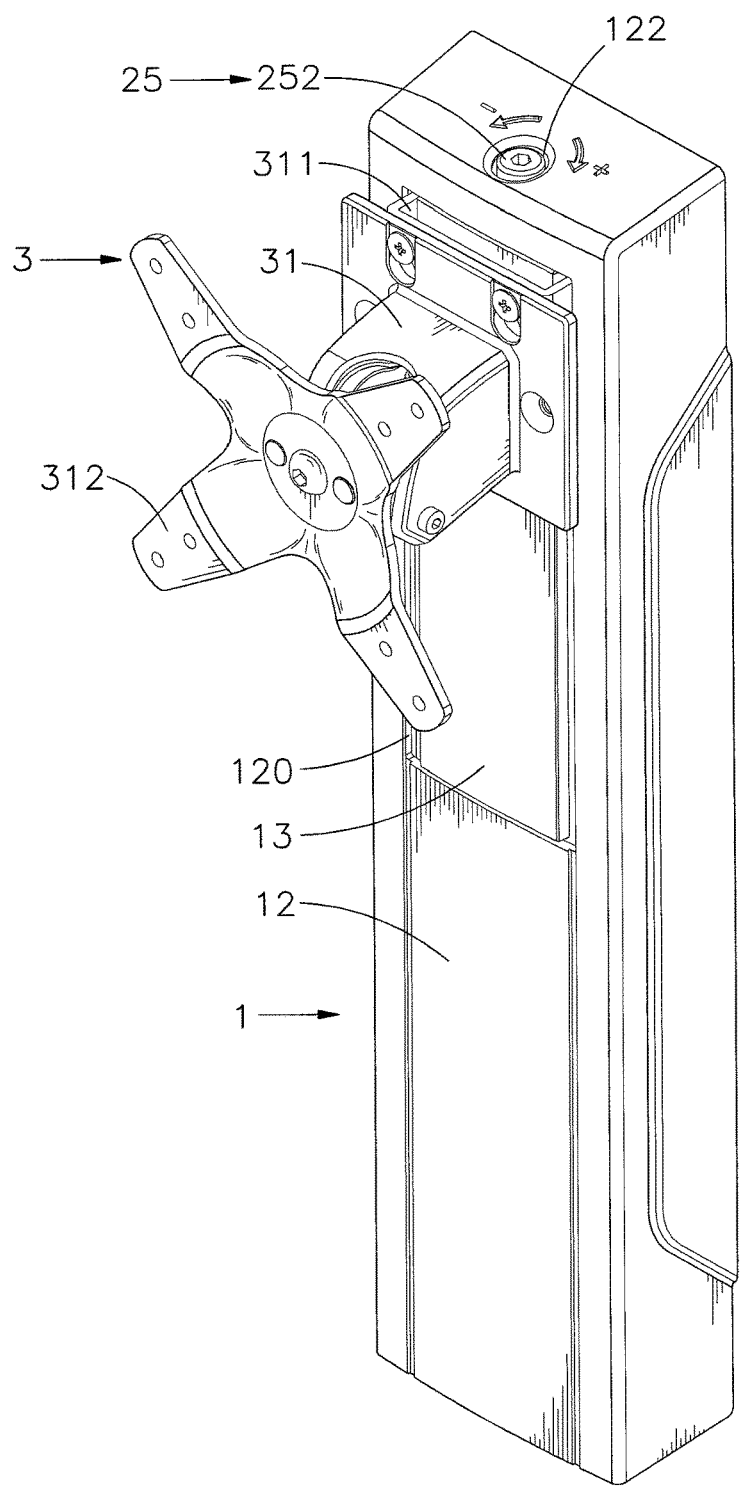
FIG. 1 is an oblique top elevational view of an elevation-adjustable display screen support arm in accordance with the present invention.
Figure 2:
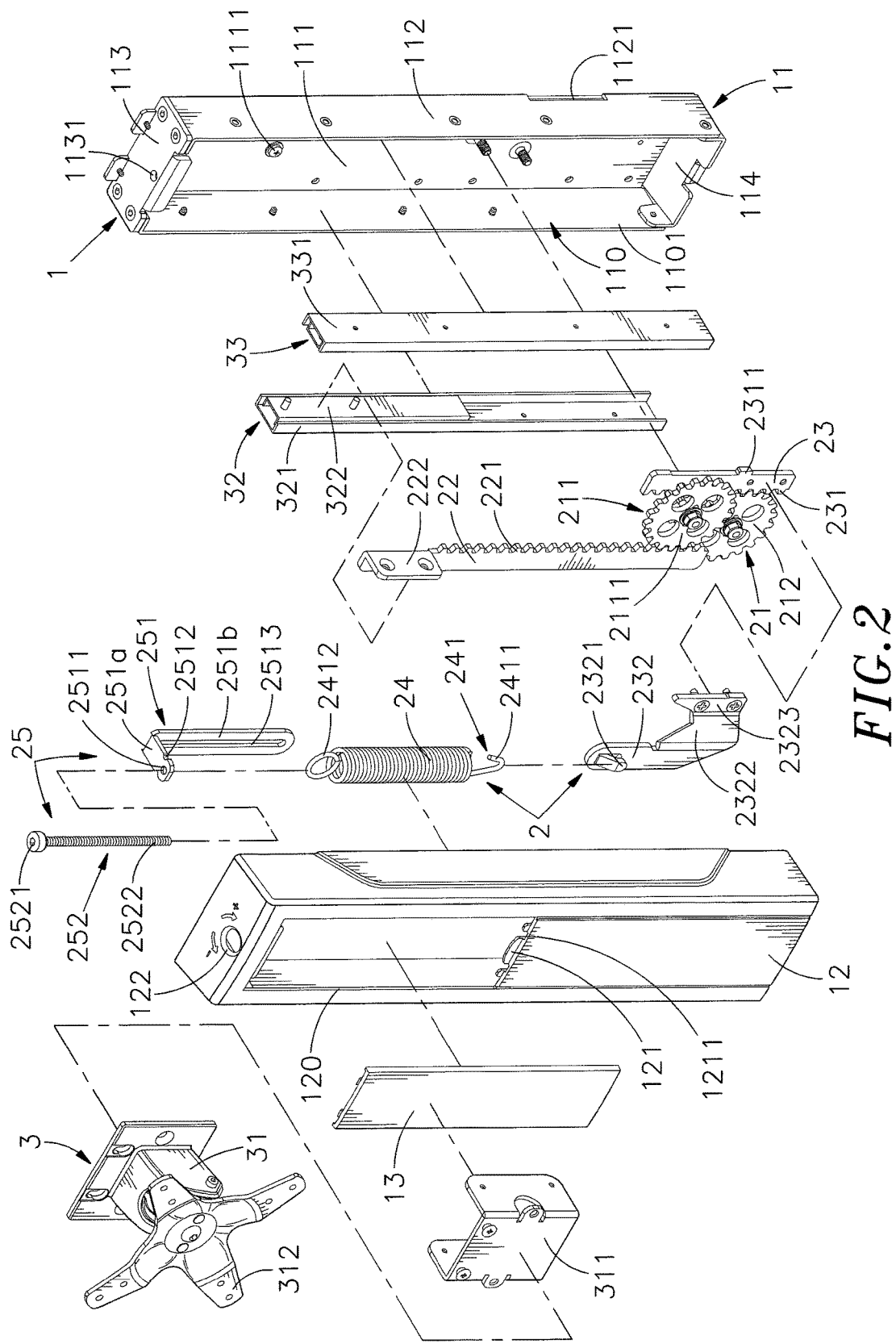
FIG. 2 is an exploded view of the elevation-adjustable display screen support arm in accordance with the present invention.
Figure 3:
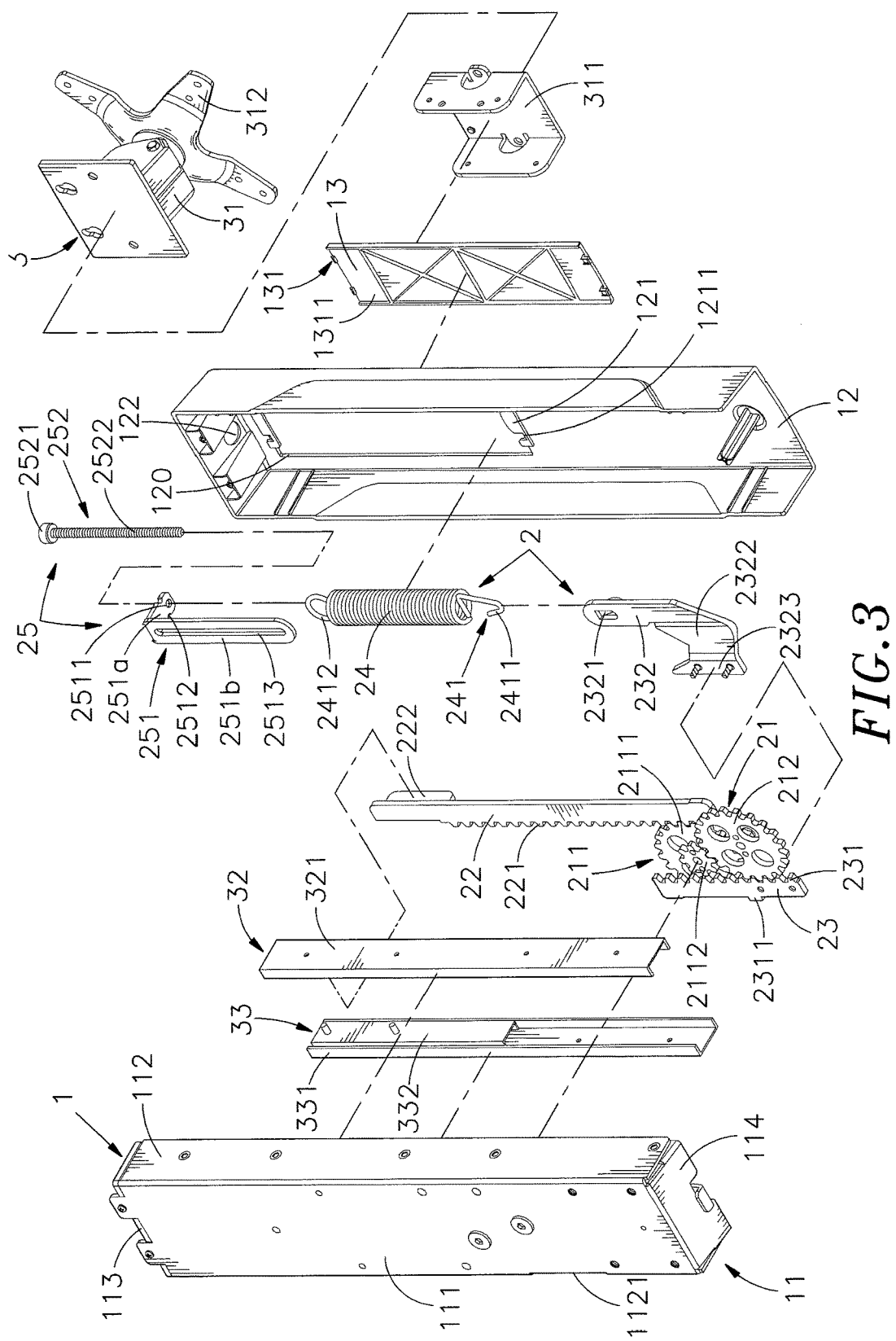
FIG. 3 corresponds to FIG. 2 when viewed from another angle.
Figure 4:
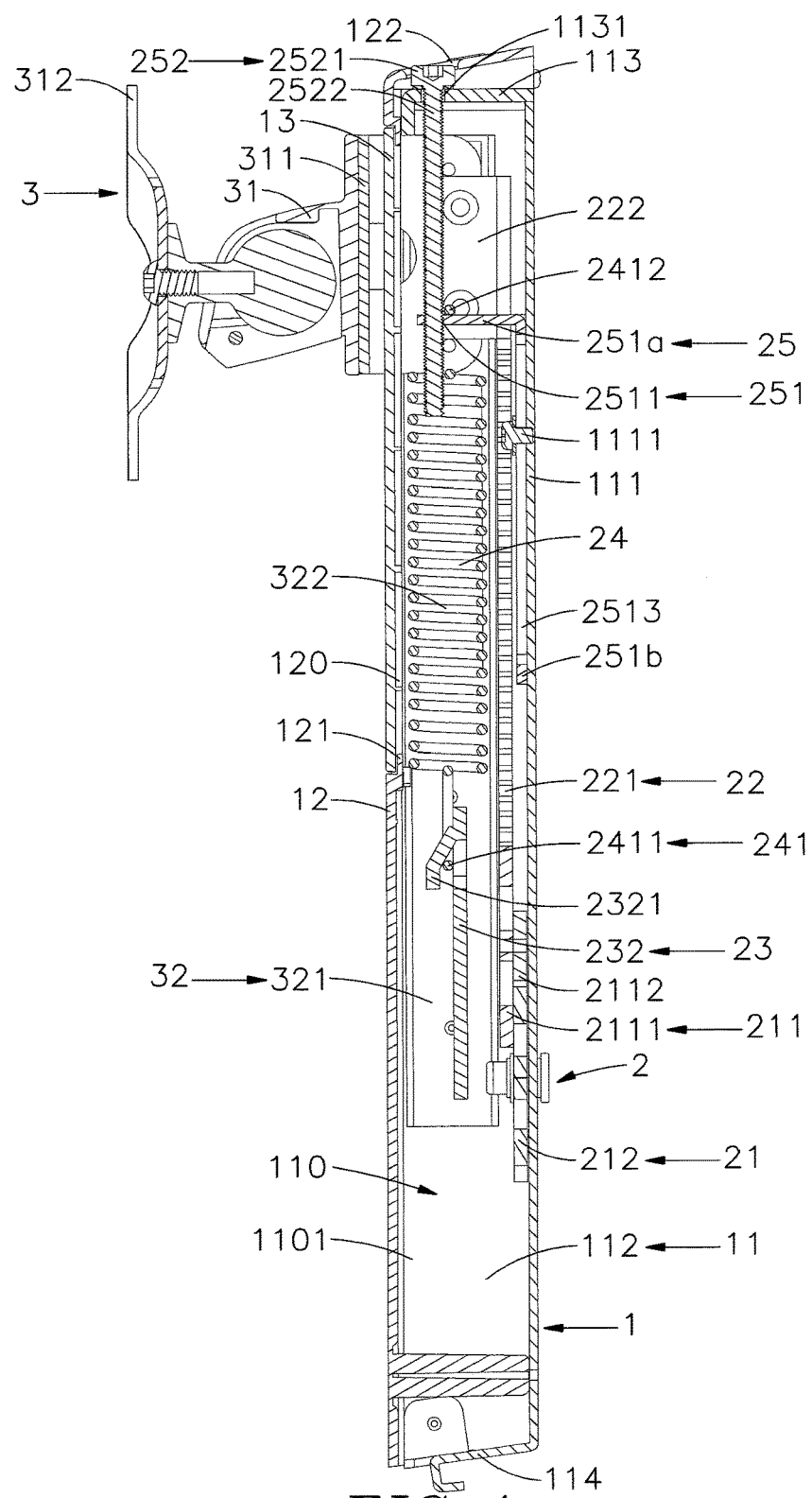
FIG. 4 is a sectional side view of the elevation-adjustable display screen support arm in accordance with the present invention.
Figure 5:
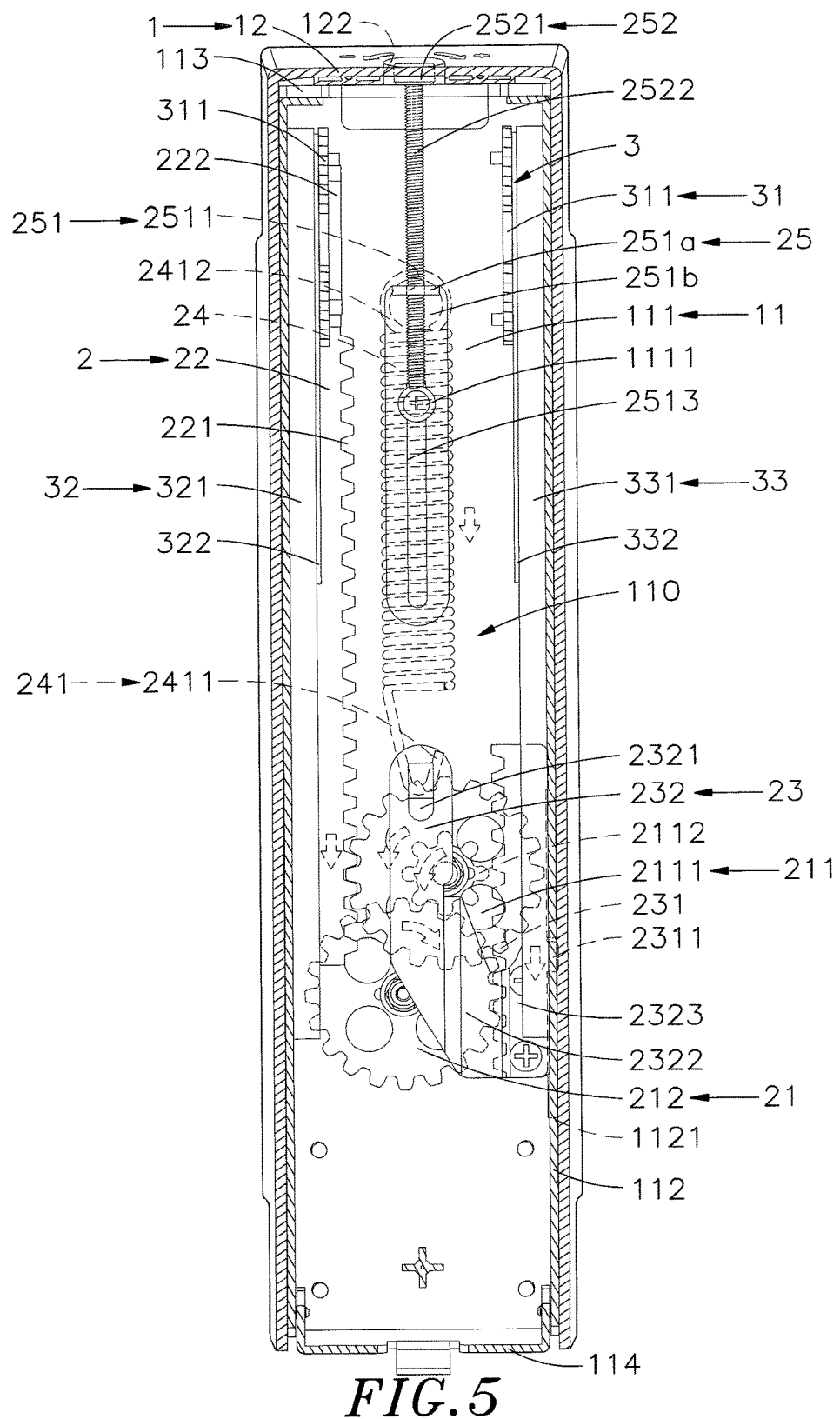
FIG. 5 is a sectional front view illustrating the status of the elevation-adjustable display screen support arm before elevation adjustment of the display screen mounting head.
Figure 6:
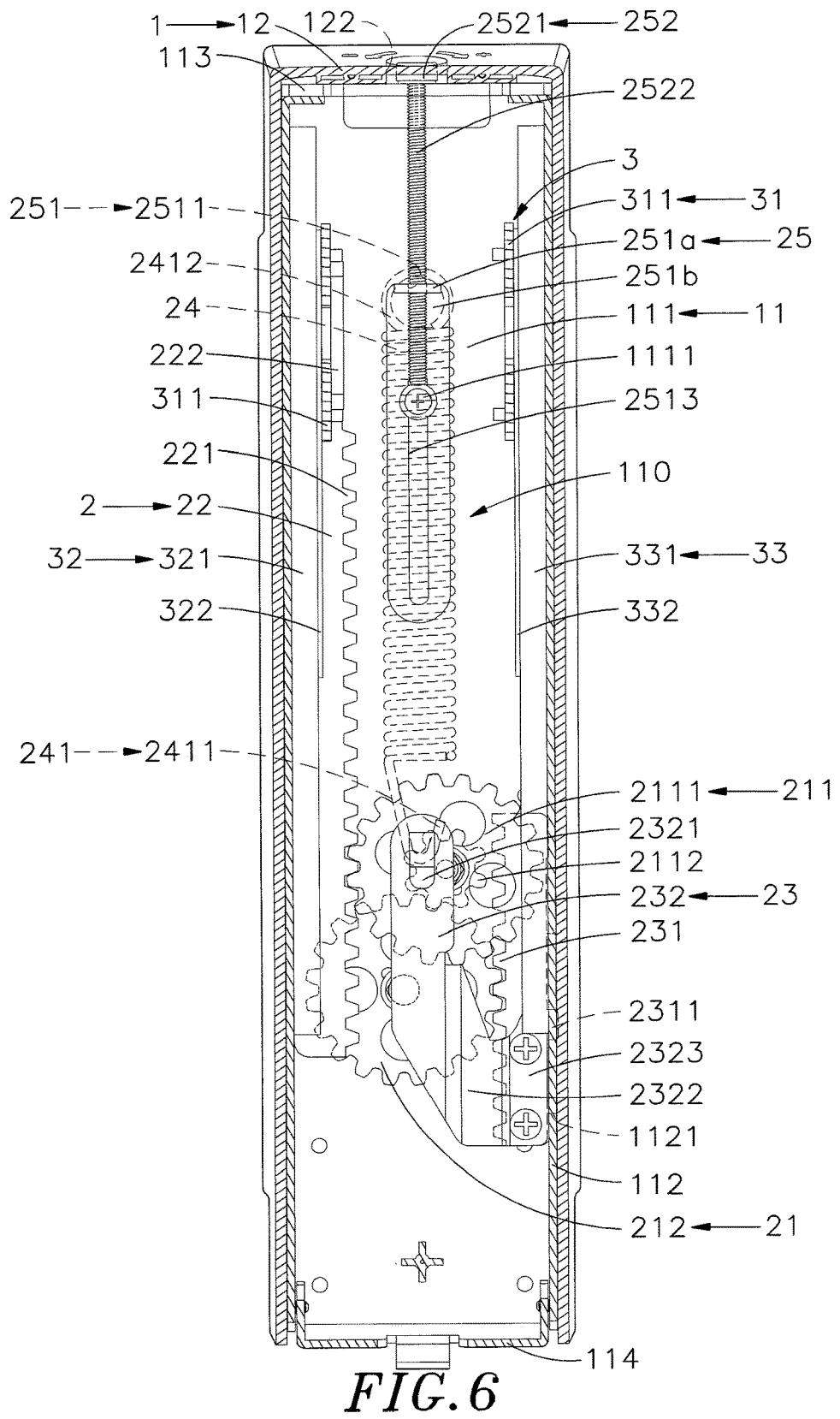
FIG. 6 corresponds to FIG. 5, illustrating the elevation of the display screen mounting head adjusted.
Figure 7:
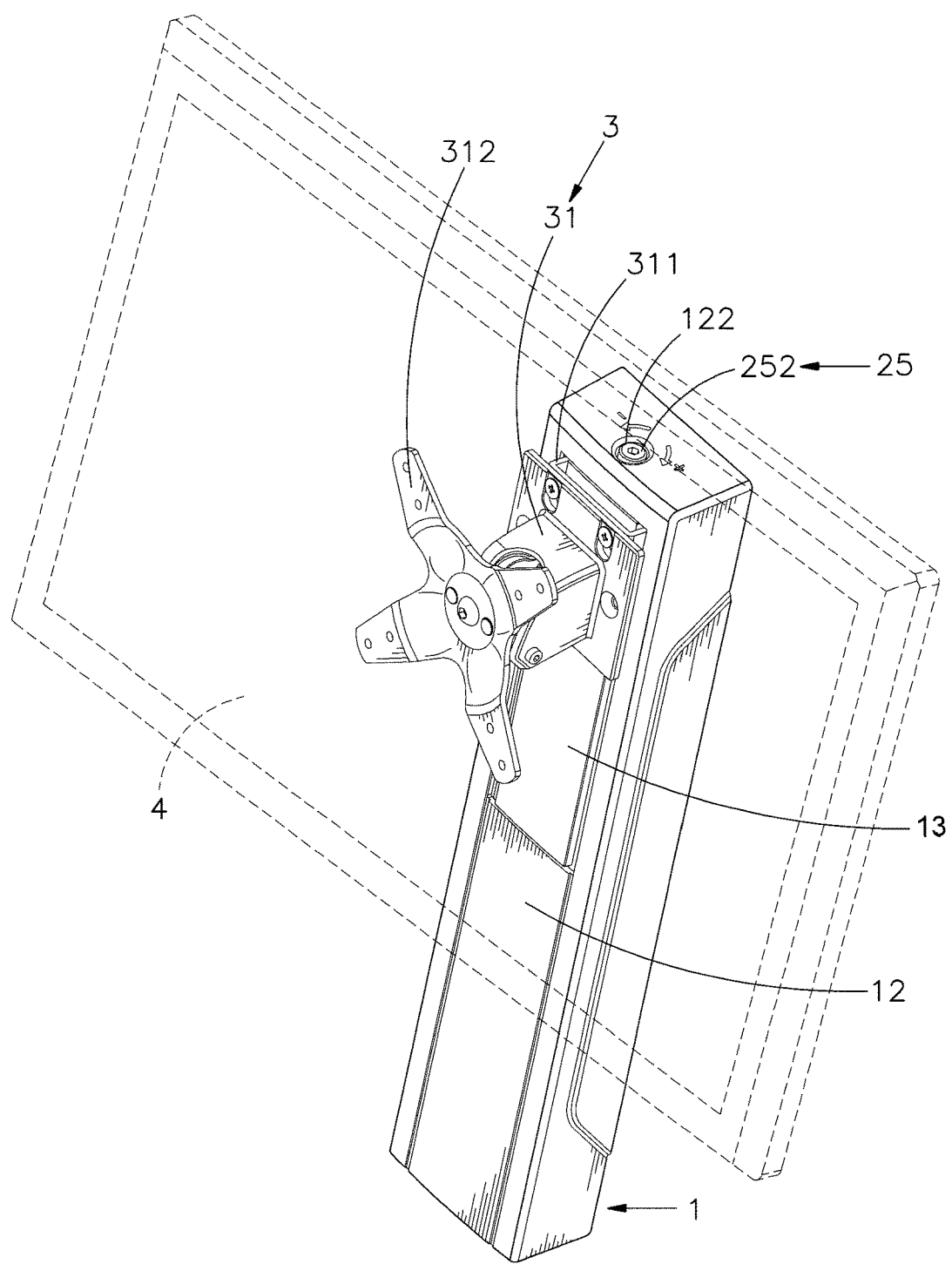
FIG. 7 is a schematic applied view of the present invention, illustrating a display screen supported on the display screen mounting head of the elevation-adjustable display screen support arm.
Figure 8:
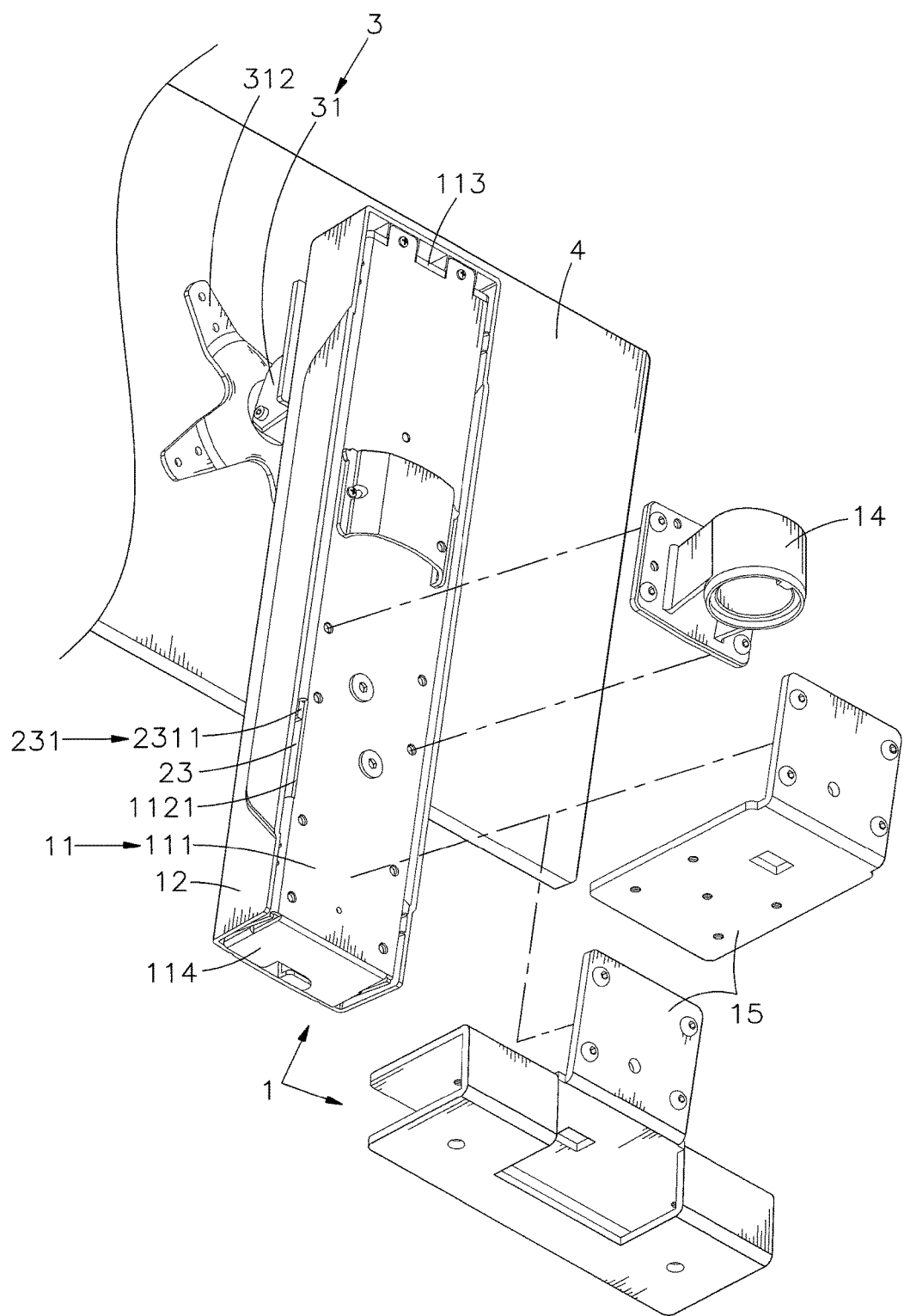
FIG. 8 is an exploded view of an alternate form of the elevation-adjustable display screen support arm in accordance with the present invention.

Referring to FIGS. 1-4, an elevation-adjustable display screen support arm in accordance with the present invention is shown. The elevation-adjustable display screen support arm comprises an arm shaft 1, a balance adjustment mechanism 2 and a display screen mounting head 3.

The arm shaft 1 comprises a box-like shaft body 11, an outer cover 12 and a front panel 13. The box-like shaft body 11 comprises a back panel 111, two opposing side panels 112 respectively located at opposing left and right sides of the back panel 111 at right angles, a top panel 113 forwardly perpendicularly extended from a top side of the back panel 111, a bottom panel 114 obliquely extended from an opposing bottom side of the back panel 111, an accommodation chamber 110 surrounded by the back panel 111, the side panels 112, the top panel 113 and the bottom panel 114 and defining a front opening 1101, a guide rod 1111 located at a middle part of an upper half of the back panel 111 and suspending in the front opening 1101, a position-limiting slot 1121 longitudinally cut through a lower part of one side panel 112 and disposed adjacent to the back panel 111, and a through hole 1131 cut through opposing top and bottom surfaces of the top panel 113 and disposed near the front opening 1101.

The outer cover 12 is attached to the box-like shaft body 11 and covered over the front opening 1101 of the accommodation chamber 110, comprising an upper opening 120 defined in an upper part of a front side thereof and disposed in communication with the accommodation chamber 110, two retaining flanges 121 with multiple retaining holes 1211 respectively disposed at opposing top and bottom sides of the upper opening 120, a top hole 122 located on a top side thereof corresponding to the through hole 1131, and an indicator mark located on the top side around the top hole 122. The front panel 13 comprises two engagement flanges 131 with multiple engagement lugs 1311 respectively located at opposing top and bottom sides thereof. By means of forcing the engagement lugs 1311 of the engagement flanges 131 into engagement with the respective retaining holes 1211 of the respective retaining flanges 121, the front panel 13 is fastened to the upper opening 120 of the outer cover 12.

The balance adjustment mechanism 2 is mounted in the accommodation chamber 110 of the box-like shaft body 11, comprising a gear train 21, a first sliding tooth rack 22, a second sliding tooth rack 23 and a tension spring 24 connected to and stretchable by the second sliding tooth rack 23. The gear train 21 comprises a drive gear 211 rotatably mounted on the back panel 111, and a driven gear 212 meshed with the drive gear 211. The drive gear 211 comprises a main gear 2111, and an auxiliary gear 2112 coaxially connected to the main gear 2111 and meshed with the driven gear 212. The gear radius of the auxiliary gear 2112 is shorter than the gear radius of the main gear 2111. The gear train 21 is meshed between the first sliding tooth rack 22 and the second sliding tooth rack 23 for driving the first sliding tooth rack 22 and the second sliding tooth rack 23 to move longitudinally in reversed directions. The first sliding tooth rack 22 and the second sliding tooth rack 23 each have a series of teeth 221 or 231 respectively meshed with the main gear 2111 or the driven gear 212. The length of the first sliding tooth rack 22 is about twice the length of the second sliding tooth rack 23. By means of changing the gear ratio between the main gear 2111 and auxiliary gear 2112 of the gear train 21, the sliding speed ratio between the first sliding tooth rack 22 and the second sliding tooth rack 23 is relatively changed.

The first sliding tooth rack 22 further comprises a linking plate 222 perpendicularly disposed at one end of the series of teeth 221 and suspending in the accommodation chamber 110 of the box-like shaft body 11 in a parallel manner relative to the side panels 112. The second sliding tooth rack 23 further comprises a stop block 2311 located at one side thereof opposite to the series of teeth 231 and inserted into the position-limiting slot 1121, and an actuating plate 232 extended from a lower front side thereof in direction toward the first sliding tooth rack 22. The actuating plate 232 comprises a mounting portion 2323 affixed to the lower front side of the second sliding tooth rack 23, a hook portion 2321 connected with one end of the tension spring 24, and a curved segment 2322 connected between the mounting portion 2323 and the hook portion 2321. The tension spring 24 is connected between the actuating plate 232 of the second sliding tooth rack 23 and the box-like shaft body 11. The tension spring 24 has two opposite end pieces 241 thereof respectively terminating in a hook tip 2411 or ring tip 2412. The hook tip 2411 of the end piece 241 at the bottom end of the tension spring 24 is hooked up with the hook portion 2321 of the actuating plate 232. The ring tip 2412 of the end piece 241 at the opposing top end of the tension spring 24 is fastened to an inside wall of the box-like shaft body 11.

In the present preferred embodiment, the balance adjustment mechanism 2 further comprises a torque adjustment unit 25 for adjusting the tension of the tension spring 24. The torque adjustment unit 25 comprises a stop member 251 set between the box-like shaft body 11 and the tension spring 24, and an adjustment screw 252 mounted in the stop member 251. The stop member 251 is an angle plate comprising a short transverse top plate portion 251a, a long longitudinal bottom plate portion 251b extended from one end of the short transverse top plate portion 251a at right angles, a screw hole 2511 extended through opposing top and bottom surfaces of the short transverse top plate portion 251a, two side notches 2512 respectively located on two opposite lateral sides of the short transverse top plate portion 251a for the hanging of the ring tip 2412 of the end piece 241 at the top end of the tension spring 24, and a longitudinal sliding slot 2513 located on the long longitudinal bottom plate portion 251b and coupled to the guide rod 1111 at the back panel 111 of the box-like shaft body 11 for guiding the stop member 251 to slide longitudinally back and forth. The adjustment screw 252 comprises a screw head 2521, and a screw shank 2522 extended from one side of the screw head 2521. The screw head 2521 is disposed outside the top hole 122 of the outer cover 12 and stopped at a top surface of the top panel 113 around the through hole 1131. The screw shank 2522 is downwardly inserted through the through hole 1131 and threaded into the screw hole 2511 in the short transverse top plate portion 251a and then inserted into the inside of the tension spring 24.

The display screen mounting head 3 comprises a body block 31, a first guideway 32 and a second guideway 33. The first guideway 32 and the second guideway 33 are respectively mounted on the two side panels 112 of the box-like shaft body 11. The body block 31 comprises a substantially ⊔-shaped connection panel 311 located at a back side thereof that is attached onto the outer cover 12 with two opposite angled lateral sides thereof respectively extended over two opposite lateral sides of the front panel 13 into the inside of the upper opening 120 of the outer cover 12 and the accommodation chamber 110 in the box-like shaft body 11, and a locating plate 312 located at an opposing front side thereof. Preferably, the locating plate 312 is connected to the front side of the body block 31 through a ball and socket joint. The first guideway 32 and the second guideway 33 each comprise a track 321,331, and a slide 322,332 coupled to and movable along the track 321,331. The tracks 321,331 are respectively affixed to the side panels 112. The connection panel 311 of the body block 31 has one angled lateral side thereof fixedly connected to the linking plate 222 of the first sliding tooth rack 22 and the slide 322 of the first guideway 32, and the other angled lateral side thereof fixedly connected to the slide 322 of the second guideway 33.

Referring to FIGS. 5-8, in the present preferred embodiment, the connection panel 311 of the display screen mounting head 3 is fastened to the body block 31 with screws. In actual application, the connection panel 311 can be formed integral with the body block 31.

The elevation-adjustable display screen support arm can be used for supporting any type of display screens, including desktop or industrial display screens, interactive or medical-type cantilever screens and workstation screens. In installation, affix a display screen 4 to the locating plate 312 at the back side of the body block 31 of the display screen mounting head 3 (see FIG. 7), allowing the display screen 4 to be tiled upward or downward, rotated on the axis thereof, or biased leftward or rightward to adjust the view angle. Further, a socket bracket 14, hanger bracket, wall bracket or any other design of mounting assembly can be affixed to a back surface of the back panel 111 of the box-like shaft body 11 of the arm shaft 1 for allowing installation of the arm shaft 1 in a rack, support, wall, desk, table, etc. Alternatively, a table clamp 15 can be provided at a bottom side of the bottom panel 114 of the box-like shaft body 11 of the arm shaft 1 for fastening the arm shaft 1 to a border edge of a tabletop. The table clamp 15 can be configured to provide a keyboard tray for holding a keyboard and a mouse for operation by the user in a sitting or standing position.

When the user wishes to adjust the elevation of the display screen 4, move the display screen 4 upward or downward with the two hands directly. At this time, the body block 31 of the display screen mounting head 3 drives the first sliding tooth rack 22 of the balance adjustment mechanism 2 and the slide 322 of the first guideway 32 to move upward or downward along the track 321. At this time, the slide 332 of the second guideway 33 is forced to move downward or upward along the track 331; the series of teeth 221 of the first sliding tooth rack 22 drives the drive gear 211 and driven gear 212 of the gear train 21 to rotate, causing the driven gear 212 to move the series of teeth 231 of the second sliding tooth rack 23, and therefore the actuating plate 232 is forced to move in the same direction of the first sliding tooth rack 22. At the same time, the end piece 241 of the tension spring 24 is forced by the actuating plate 232 to stretch or compress the tension spring 24. Thus, rotation of the gear train 21 causes the tension spring 24 to provide a corresponding torque that is acted upon the first sliding tooth rack 22 to control upward or downward movement of the display screen mounting head 3 and the display screen 4. The first guideway 32 and the second guideway 33 assist the body block 31 to reciprocate stably and smoothly in the longitudinal direction, allowing adjustment of the elevation of the display screen 4 in a stepless manner without the use of any tool or fixation screws and keeping the display screen 4 for automatic positioning. Further, by means of stopping the stop block 2311 of the second sliding tooth rack 23 at the top or bottom end of the position-limiting slot 1121 of the box-like shaft body 11, the elevation adjustment of the display screen 4 is limited to a predetermined range, avoiding overstretch of the tension spring 24 and automatic positioning failure of the display screen 4. Thus, the user can adjust the elevation of the display screen 4 easily with less effort.

Figure 9:
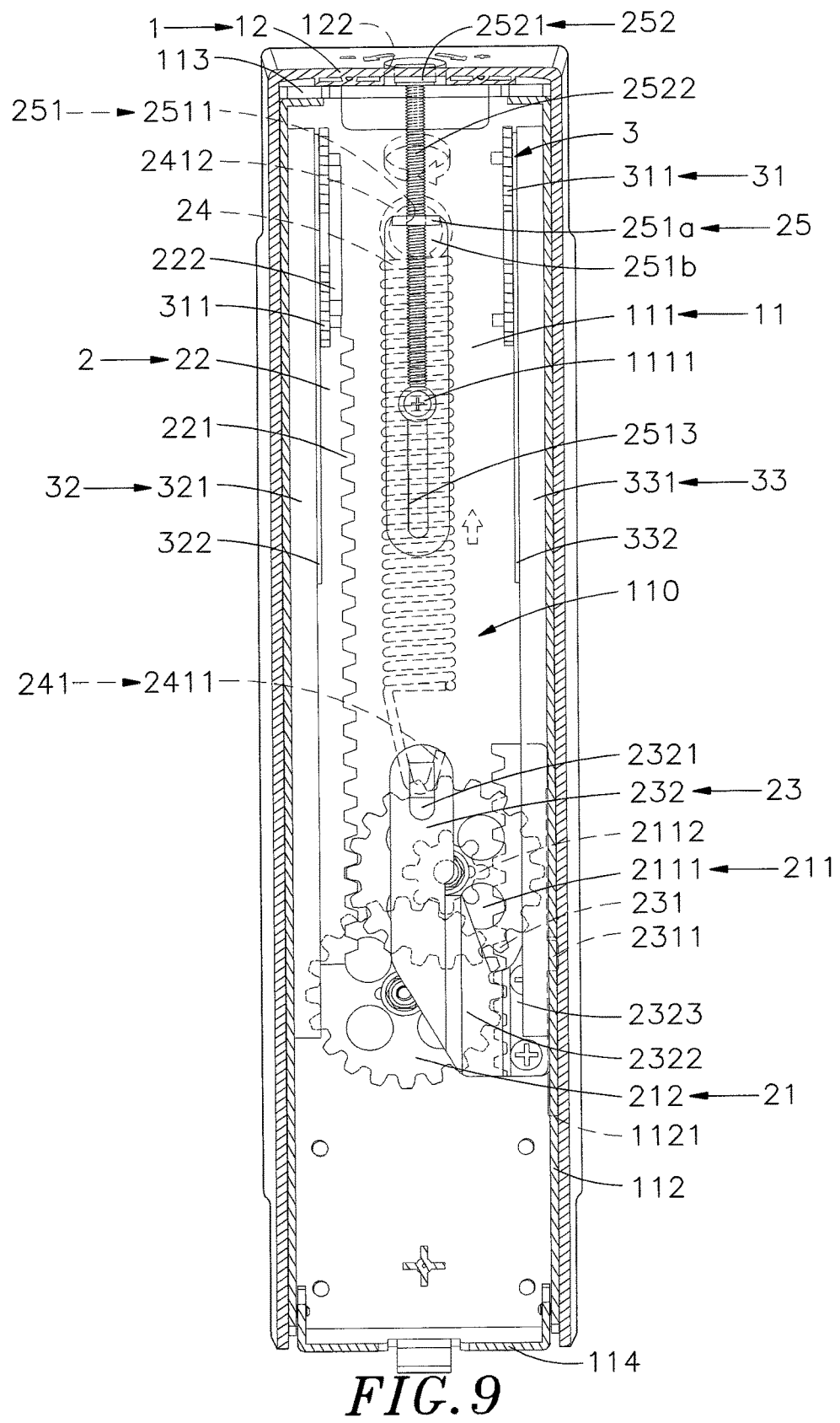
FIG. 9 is a sectional front view illustrating a load adjustment status of the elevation-adjustable display screen support arm in accordance with the present invention.
Figure 10:
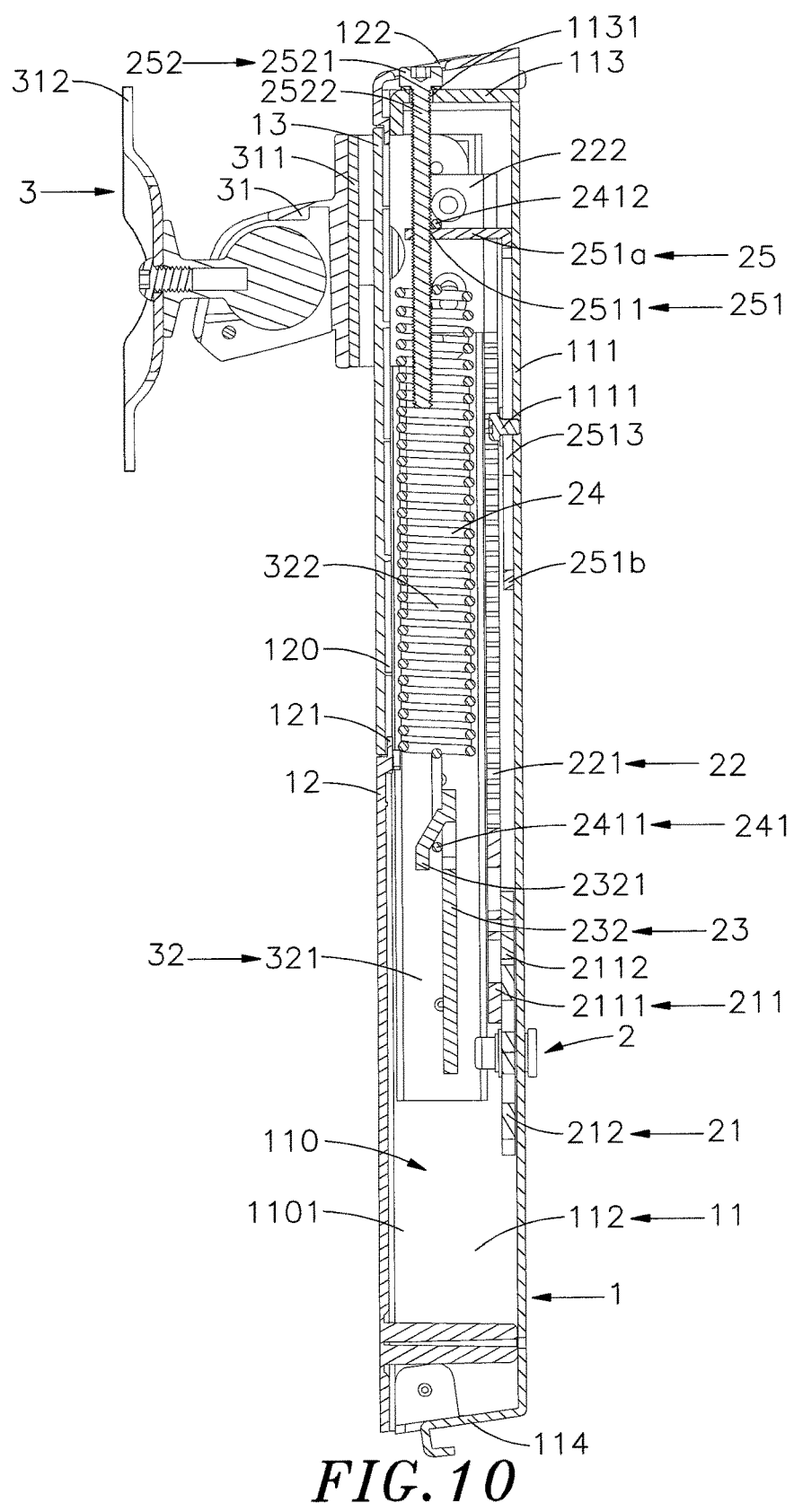
FIG. 10 is a sectional side view of the present invention after a load adjustment.

Referring to FIGS. 9 and 10, the user can adjust the torque adjustment unit 25 of the balance adjustment mechanism 2 according to the weight of the display screen 4. At this time, use a tool to rotate the screw head 2521 of the adjustment screw 252 that is disposed outside the top hole 122 of the outer cover 12, driving the screw shank 2522 in the screw hole 2511 of the stop member 251 and causing movement of the stop member 251 relative to the adjustment screw 252. At this time, the longitudinal sliding slot 2513 of the stop member 251 is moved longitudinally upward or downward relative to the guide rod 1111 of the back panel 111, and thus, the stop member 251 can adjust the tension of the tension spring 24. When the stop member 251 is moved downward, the tension spring 24 is shortened, and its tension is relatively reduced. On the contrary, when the stop member 251 is moved upward, the tension spring 24 is driven to expand, and the gear train 21 converts the tension of the tension spring 24 into torque. Thus, the adjustment screw 252 of the torque adjustment unit 25 can be fastened tighter when the load of the display screen 4 is relatively larger; on the contrary, the adjustment screw 252 of the torque adjustment unit 25 can be relatively loosened when the load of the display screen 4 is relatively smaller, allowing elevation adjustment of the display screen 4 to be smoothly performed.

As described above, the outer cover 12 is covered on the front side of the box-like shaft body 11 of the arm shaft 1; the balance adjustment mechanism 2 is mounted in the box-like shaft body 11, comprising the gear train 21, the first sliding tooth rack 22, the second sliding tooth rack 23 and the tension spring 24 that is connected to and stretchable by the second sliding tooth rack 23; the display screen mounting head 3 comprises the body block 31, the first guideway 32 and the second guideway 33; the first guideway 32 and the second guideway 33 are respectively mounted on the two side panels 112 of the box-like shaft body 11. When adjusting the elevation of the display screen 4 that is mounted on the display screen mounting head 3, the first sliding tooth rack 22 is forced to rotate the gear train 21, causing the gear train 21 to carry the second sliding tooth rack 23 and the actuating plate 232 in stretching or compression the tension spring 24, and thus, the gear train 21 converts the tension of the tension spring 24 into torque for free elevation adjustment and automatic positioning of the display screen mounting head 3 and the supported display screen 4.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An elevation-adjustable display screen support arm, comprising:
    an arm shaft comprising a box-like shaft body defining therein an accommodation chamber and a front opening in communication with said accommodation chamber, and an outer cover fastened to said box-like shaft body and covered over said front opening, said outer cover defining therein an upper opening in communication with said accommodation chamber;
    a balance adjustment mechanism mounted in said accommodation chamber of said box-like shaft body, said balance adjustment mechanism comprising a first sliding tooth rack, a second sliding tooth rack, a gear train meshed between said first sliding tooth rack and said second sliding tooth rack, a tension spring connected between said box-like shaft body and said second sliding tooth rack, and an actuating plate mounted at said second sliding tooth rack and connected to a bottom end of said tension spring; and
    a display screen mounting head comprising a body block for supporting a display screen at a front side thereof, a first guideway and a second guideway respectively mounted on two side panels of said box-like shaft body, and a connection panel mounted at an opposing back side of said body block and inserted through said upper opening of said outer cover into an inside of said box-like shaft body and fixedly connected to said first sliding tooth rack, said first guideway and said second guideway;
    wherein when adjusting an elevation of said display screen, said body block of said display screen mounting head is driven to move said first sliding tooth rack in rotating said gear train, causing said gear train to move said second sliding tooth rack in driving said actuating plate to stretch or compress said tension spring, and thus, rotation of said gear train causes said tension spring to provide a corresponding torque that is acted upon said first sliding tooth rack to control upward or downward movement of said display screen mounting head and said display screen in a stepless manner.

2. The elevation-adjustable display screen support arm as claimed in claim 1, wherein said box-like shaft body of said arm shaft comprises a back panel, two opposite said side panels respectively located at two opposite lateral sides of said back panel, a top panel located at a top side of said back panel, a bottom panel located at an opposing bottom side of said back panel; said connection panel attached onto said outer cover with two opposite angled lateral sides thereof respectively extended over two opposite lateral sides of a front panel into an inside of said upper opening of said outer cover and said accommodation chamber in said box-like shaft body for fixation to said first guideway and said second guideway.

3. The elevation-adjustable display screen support arm as claimed in claim 2, wherein said box-like shaft body further comprises a position-limiting slot longitudinally located in one said side panel adjacent to said back panel; said second sliding tooth rack comprises a stop block inserted into said position-limiting slot and stoppable at one of opposing top and bottom ends of said position-limiting slot to limit a moving range of said second sliding tooth rack.

4. The elevation-adjustable display screen support arm as claimed in claim 2, wherein said outer cover further comprises two retaining flanges respectively disposed at opposing top and bottom sides of said upper opening and a plurality of retaining holes defined in each said retaining flange; said front panel comprises two engagement flanges respectively disposed at opposing top and bottom side thereof and a plurality of engagement lugs defined in each said engagement flange for engagement with said retaining holes of said outer cover.

5. The elevation-adjustable display screen support arm as claimed in claim 1, wherein said box-like shaft body of said arm shaft comprises a back panel, and two opposite said side panels respectively located at two opposite lateral sides of said back panel; said gear train of said balance adjustment mechanism comprises a drive gear and a driven gear respectively pivotally mounted at said back panel and meshed together; said first sliding tooth rack and said second sliding tooth rack each comprise a series of teeth respectively meshed with said drive gear and said driven gear, a length of said first sliding tooth rack being greater than a length of said second sliding tooth rack.

6. The elevation-adjustable display screen support arm as claimed in claim 5, wherein said drive gear of said gear train comprises a main gear meshed with the series of teeth of said first sliding tooth rack, and an auxiliary gear coaxially connected to said driven gear, the gear radius of said auxiliary gear being shorter than said main gear.

7. The elevation-adjustable display screen support arm as claimed in claim 5, wherein said first sliding tooth rack further comprises a linking plate in a parallel manner relative to said side panels; a first guideway and a second guideway each comprise a track and a slide coupled to and movable along said track, said tracks of said first guideway and said second guideway being respectively affixed to said side panels of said box-like shaft body; said connection panel of said body block has a lateral side thereof affixed to said linking plate of said first sliding tooth rack and said slide of said first guideway, and said connection panel of said body block has another lateral side thereof affixed to said slide of said second guideway.

8. The elevation-adjustable display screen support arm as claimed in claim 1, wherein said balance adjustment mechanism further comprises a torque adjustment unit, said torque adjustment unit comprising a stop member set between said box-like shaft body and said tension spring, and an adjustment screw mounted in said stop member; said tension spring has a top end and a bottom end thereof respectively connected to said stop member and said actuating plate of said second sliding tooth rack so that rotating said adjustment screw drives said stop member to adjust the tension of said tension spring.

9. The elevation-adjustable display screen support arm as claimed in claim 8, wherein said box-like shaft body comprises a back panel and a guide rod located at a middle part of an upper half of said back panel; said stop member of said torque adjustment unit is an angle plate comprising a short transverse top plate portion, a long longitudinal bottom plate portion extended from said short transverse top plate portion at a right angle, a screw hole extended through opposing top and bottom surfaces of said short transverse top plate portion for receiving said adjustment screw, and a longitudinal sliding slot located on said long longitudinal bottom plate portion and coupled to said guide rod for guiding said stop member to slide longitudinally back and forth.

10. The elevation-adjustable display screen support arm as claimed in claim 9, wherein said box-like shaft body further comprises a top panel located at a top side of said back panel, and a through hole cut through opposing top and bottom surfaces of said top panel; said adjustment screw of said torque adjustment unit comprises a screw head and a screw shank extended from one side of said screw head, said screw head being stopped at a top surface of said top panel around said through hole, said screw shank being downwardly inserted through said through hole and threaded into said screw hole in said short transverse top plate portion.

11. The elevation-adjustable display screen support arm as claimed in claim 8, wherein said actuating plate of said second sliding tooth rack is upwardly inserted in between said first sliding tooth rack and said second sliding tooth rack, comprising a hook portion located at a top side thereof, a curved segment located at a bottom side thereof and facing toward said second sliding tooth rack, and a mounting portion affixed to a lower front side of said second sliding tooth rack; said tension spring has a bottom end piece thereof hooked up with said hook portion for driving by said actuating plate.

12. The elevation-adjustable display screen support arm as claimed in claim 1, wherein said display screen mounting head further comprises a locating plate located at the front side of said body block for fixation to a back side of said display screen.

\* \* \* \* \*